(12) United States Patent
Munch

(10) Patent No.: US 8,152,470 B2
(45) Date of Patent: Apr. 10, 2012

(54) DEVICE FOR THE ADJUSTMENT OF THE PITCH OF A MOTOR BLADE OF A WIND TURBINE

(75) Inventor: Jesper Munch, Vejle (DK)

(73) Assignee: Siemens Aktiengesellschaft, Munich (DE)

( * ) Notice: Subject to any disclaimer, the term of this patent is extended or adjusted under 35 U.S.C. 154(b) by 993 days.

(21) Appl. No.: 12/154,303

(22) Filed: May 22, 2008

(65) Prior Publication Data

US 2008/0292462 A1 Nov. 27, 2008

(30) Foreign Application Priority Data

May 25, 2007 (EP) ..................................... 07010504

(51) Int. Cl.
*B64C 11/42* (2006.01)
(52) U.S. Cl. ...................................................... 416/156
(58) Field of Classification Search .................. 416/155, 416/156
See application file for complete search history.

(56) References Cited

U.S. PATENT DOCUMENTS

| 2,032,254 | A | * | 2/1936 | Caldwell | 416/46 |
| 3,395,762 | A | * | 8/1968 | Itazawa | 416/162 |
| 4,020,781 | A | * | 5/1977 | Bellew | 440/50 |
| 6,499,952 | B1 | * | 12/2002 | Jacot et al. | 416/155 |
| 6,644,922 | B2 | * | 11/2003 | McCallum et al. | 416/156 |
| 7,547,985 | B2 | * | 6/2009 | Takaichi et al. | 290/55 |
| 7,905,707 | B2 | * | 3/2011 | Numajiri et al. | 416/155 |

FOREIGN PATENT DOCUMENTS

| DE | 19739164 A1 | 3/1999 |
| EP | 1126163 A1 | 8/2001 |
| JP | 2001099045 A | 4/2001 |
| JP | 2005113823 A | 4/2005 |
| WO | WO 0127471 A1 | 4/2001 |

OTHER PUBLICATIONS

Erich Hau, "Windkraftanlagen", Grundlagentechnik, Einsatz, Wirtschaftlichkeit; 2000, Springer Verlag, Berlin, XP002463179, p. 235-237.; Book; 2000.

* cited by examiner

*Primary Examiner* — Edward Look
*Assistant Examiner* — Andrew C Knopp

(57) ABSTRACT

A device is provided for the adjustment of the pitch of a rotor blade of a wind turbine. The device includes a pitch actuator and a fixing device. The pitch actuator includes a tube. The fixing device includes a first and a second ring-like element, each of which is arranged at the tube and each of which is supported towards a respective stopper assigned to the tube, and a clamping means which press the first and the second ring-like element in such a way towards the respective stopper that the fixing device and the tube are substantially non-relocatable relatively to each other.

18 Claims, 4 Drawing Sheets

DEVICE FOR THE ADJUSTMENT OF THE PITCH OF A MOTOR BLADE OF A WIND TURBINE

CROSS REFERENCE TO RELATED APPLICATIONS

This application claims priority of European Patent Office application No. 07010504.4 EP filed May 25, 2007, which is incorporated by reference herein in its entirety.

FIELD OF INVENTION

The invention relates to a device for the adjustment of the pitch of a rotor blade of a wind turbine.

BACKGROUND OF INVENTION

A wind turbine comprises two, three or more rotor blades arranged at a hub. A rotor blade is as a rule adjustable relatively to the hub wherein the so called pitch of the rotor blade is adjusted. With the adjustment of the pitch of the rotor blades e.g. the operation of the wind turbine can be influenced and controlled.

SUMMARY OF INVENTION

For the adjustment of the pitch of a rotor blade in some wind turbines a hydraulic pitch cylinder is used. The hydraulic pitch cylinder comprises a piston rod movable in a tube of the hydraulic pitch cylinder. E.g. the piston rod is connected to the rotor blade and the hydraulic pitch cylinder tube is fastened at a ring of a pendulum support which is fastened at the hub. Thus when the piston rod is hydraulically moved along the hydraulic pitch cylinder tube the pitch of the corresponding rotor blade is adjusted.

As a rule the ring of the pendulum support is welded to the hydraulic pitch cylinder tube. During the welding process often some modifications of the inner surface of the hydraulic pitch cylinder tube occur due to the heat. After the welding process it is therefore necessary to roller burnish the inside of the hydraulic pitch cylinder tube to obtain the necessary tolerance for the inner diameter of the hydraulic pitch cylinder tube. This process of roller burnishing the inside of the hydraulic pitch cylinder tube is relatively expensive. Furthermore the dismantling of the hydraulic pitch cylinder tube from the ring of the pendulum support is practical non-destructively not possible in particular when a service of the hydraulic pitch cylinder or the hydraulic pitch cylinder tube is necessary.

It is therefore an object of the present invention to provide a device as initially mentioned in such a way, that the assembling and/or the dissembling of the device are/is simplified.

This object is inventively achieved by a device for the adjustment of the pitch of a rotor blade of a wind turbine comprising a pitch actuator and a fixing device. The pitch actuator comprises a tube preferably an at least partially cylindrical tube. Particularly at least two stoppers are assigned to the tube. The fixing device comprises a first and a second ring-like element, each of which is arranged at the outside of the tube and each of which is supported towards a respective stopper, as well as clamping means which press the first and the second ring-like element in such a way towards the respective stopper that the fixing device and the tube are substantially non-relocatable relatively to each other. Thus according to the invention the first ring-like element, the second ring-like element and the tube are reversible mechanically braced in such a way by means of at least two stoppers and the clamping means that the fixing device and the tube and the pitch actuator respectively are fixed relatively to each other. Thereby the fixing is achieved by a detachable connection using the clamping means and thus without welding or any other permanent connection. By means of the clamping means the first and the second ring-like element interact with each other wherein the first and the second ring-like element are connected with each other. The detachable connection using the mentioned means enables a simplified assembling of the device without expensive processes like roller burnishing as well as a simplified disassembling of the device.

According to an embodiment of the invention the clamping means comprise at least one bolt, one screw, one cramp and/or one spreader. When bolts or screws are used e.g. the second ring-like element comprises some clearance holes around its perimeter and the first ring-like element comprises some corresponding threaded holes. Thus the first and the second ring-like element can be bolted or screwed together wherein the first and the second ring-like element are pressed towards the respective stopper assigned to the tube and thereby fix the fixing device and the tube and the pitch actuator respectively relatively to each other. This can also be achieved with cramps which embrace the first and the second ring-like element and press them to the respective stopper.

Clamping means in form of bolts, screws and/or cramps are preferably used when according to an embodiment of the invention both the first ring-like element and the second ring-like element have a side which sides face each other wherein each of these sides is at least partially pressed towards the respective stopper.

Clamping means in form of spreaders are preferably used when according to another embodiment of the invention both the first ring-like element and the second ring-like element have a side which are turned away from each other wherein each of these sides is at least partially pressed towards the respective stopper. The spreaders press thereby the first ring-like element towards the first stopper and the second ring-like element towards the second stopper.

According to another variant of the invention a stopper is a free manageable stop ring or a ring-like projection on the outside of the tube. If the stopper is a stop ring the tube comprises preferably on the outside at least one groove as receptacle for the stop ring. Thereby the inner diameter or the inner dimensions of the stop ring correspond substantially to the inner diameter or the inner dimensions of the groove. The outer diameter or the outer dimensions of the stop ring are such that the stop ring projects above the outside of the tube when the stop ring is arranged in the groove. Thereby the stop ring can be an open stop ring that the stop ring is easier to arrange in the groove. According to the invention both stoppers can be a stop ring, both stoppers can be a projection of the tube or one stopper can be a stop ring and one stopper can be a projection of the tube.

In a further development of the invention the tube is preferably slightly pressed into the first ring-like element for a first fixation.

Preferably the pitch actuator is a hydraulic pitch cylinder which is fastened with the fixing device to a hub of a wind turbine. Particularly the fixing device comprises thereby one or more fixing means e.g. in form of flanges comprising clearance holes for fastening the fixing device and thus the pitch actuator at the hub.

According to another embodiment of the invention the fixing device comprises at least one bearing. Preferably the fixing device comprises four bearings that the pitch actuator can perform a pendulum motion during the adjustment of a pitch of a rotor blade.

According to a further embodiment of the invention the second ring-like element is a fixing ring.

BRIEF DESCRIPTION OF THE DRAWINGS

The invention will in the following be explained in more detail with reference to the schematic drawings, where.

DETAILED DESCRIPTION OF INVENTION

Figure 1:
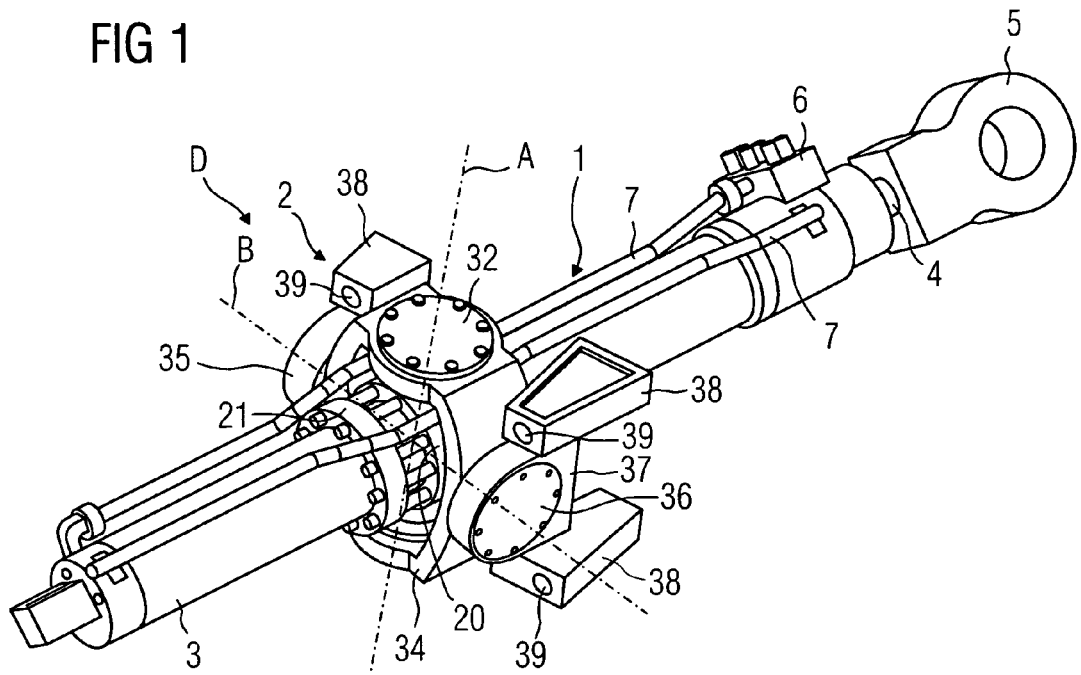
FIG. 1 shows a device for the adjustment of the pitch of a rotor blade of a wind turbine in a perspective view.

FIG. 1 shows a device D for the adjustment of the pitch of a rotor blade of a wind turbine comprising a pitch actuator in form of a hydraulic pitch cylinder 1 and a fixing device 2.

Figure 2:
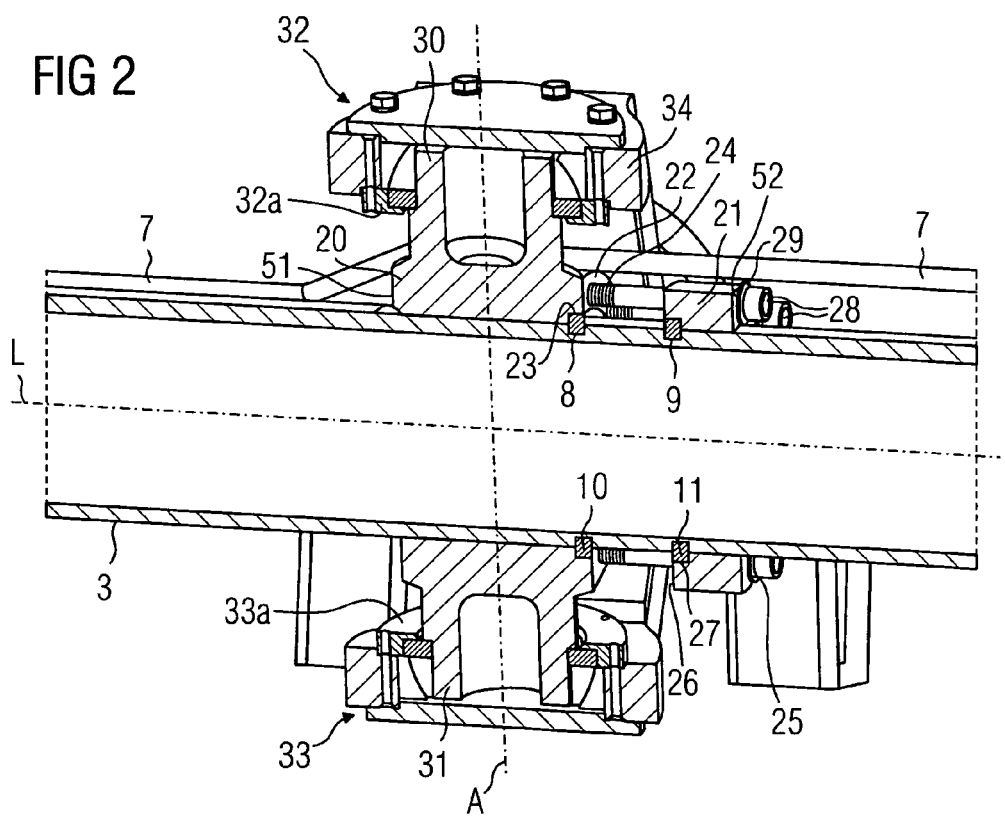
FIG. 2 shows partially a sectional view of the device of FIG. 1.

The hydraulic pitch cylinder 1 comprises a tube 3, a piston rod 4 with a flange 5 at its free end and in a common way connectors 6 as well as conduits 7 for feeding and draining off hydraulic fluid. The piston rod 4 is hydraulically movable relatively to the tube 3. In case of the present embodiment of the invention the tube 3 is substantially a cylindrical tube wherein the cylindrical tube 3 comprises two grooves 8, 9 on its outside in a certain applicable distance from each other. FIG. 2 shows the arrangement of the grooves 8, 9 relatively to each other. The groove 8 is a receptacle for a first stop ring 10 and the groove 9 is a receptacle for a second stop ring 11. In case of the present embodiment both stop rings 10 and 11 are made of a metal and are appropriately arranged in the respective groove 8, 9. Thus there is substantially no free space between a stop ring and a wall of a groove and thus substantially no movement of a stop ring within a groove. The stop rings 10 and 11 project above the tube 3 and are stoppers for parts of the fixing device 2.

The fixing device 2 comprises a first ring-like element 20 and a second ring-like element 21. The first ring-like element 20 is arranged at the tube 3 in particular around the tube 3 wherein the tube 3 is slightly pressed into the first ring-like element 20 comparable with a slight press fit. The first ring-like element 20 is thereby a kind of support ring having a side 22 with a L-shaped flute 23. The dimensions of the L-shaped flute 23 are such that the part of the stop ring 10 projecting above the tube 3 is appropriately arranged in the flute 23. Thus the first ring-like element 20 is supported towards the stop ring 10 operating as a stopper for the first ring-like element 20. Additionally the first ring-like element 20 comprises in the side 22 around its perimeter several screw holes 24. The screw holes 24 are substantially parallel to a longitudinal axis L of the tube 3.

The second ring-like element 21 is a kind of fixing ring, holding ring or holding mechanism and is also arranged at the tube 3 in particular around the tube 3. The second ring-like element 21 comprises several clearance holes or through borings 25 around its perimeter and a side 26 having a L-shaped flute 27. The clearance holes or through borings 25 are substantially parallel to the longitudinal axis L of the tube 3. The dimensions of the L-shaped flute 27 are such that the part of the stop ring 11 projecting above the tube 3 is appropriately arranged in the flute 27. Thus the second ring-like element 21 is supported towards the stop ring 11 operating as a stopper for the second ring-like element 21. Thereby the side 22 of the first ring-like element 20 and the side 26 of the second ring-like element 21 face each other.

After the attachment of the first ring-like element 20 and the second ring-like element 21 around the tube 3 what is by the way done e.g. before the sconnectors 6 and conduits 7 are mounted several screws or bolts 28 with snap rings 29 are used which press the first 20 and the second 21 ring-like element in such a way towards the respective stop ring 10, 11 that the fixing device 2 and the tube 3 are substantially non-relocatable relatively to each other. Thereby each bolt 28 is arranged in a through boring 25 of the second ring-like element 21 and screwed in one screw hole 24 of the first ring-like element 20. By tightening the bolts 28 the first ring-like element 20 is pressed towards the stop ring 10 and the second ring-like element 21 is pressed towards the stop ring 11.

The first ring-like element 20 comprises additionally two projecting parts 30, 31 facing each other. At each projecting part 30, 31 a bearing 32, 33 is arranged. Thus the hydraulic pitch cylinder 1 can be pivoted around a first bearing shaft A or a first axis A. In case of the present embodiment the bearings 32 and 33 are plain bearings. The bearing part 32a of the bearing 32 and the bearing part 33a of the bearing 33 are attached to a third ring-like element 34. The third ring-like element 34 substantially surrounds the first ring-like element 20 wherein the space between the first ring-like element 20 and the third ring-like element 34 is such that the hydraulic pitch cylinder 1 can pivot in a sufficient way around the bearing shaft A.

Attached to the third ring-like element 34 are two further bearings 35, 36 allowing the hydraulic pitch cylinder 1 to be pivoted around a second bearing shaft B or a second axis B which is substantially perpendicular to the first bearing shaft A. In case of the present embodiment of the invention the bearings 35, 36 are also plain bearings.

At the static parts 37 of the bearings 35, 36 are attached fixing means in form of flanges 38. Each flange 38 comprises a clearance hole or through boring 39. By means of the flanges 38 and not shown screws or bolts the device D comprising the fixing device 2 and the hydraulic pitch cylinder 1 can be attached in particular screwed at a hub 40 of a wind turbine as can be seen from FIG. 3 and FIG. 4.

Figure 5:
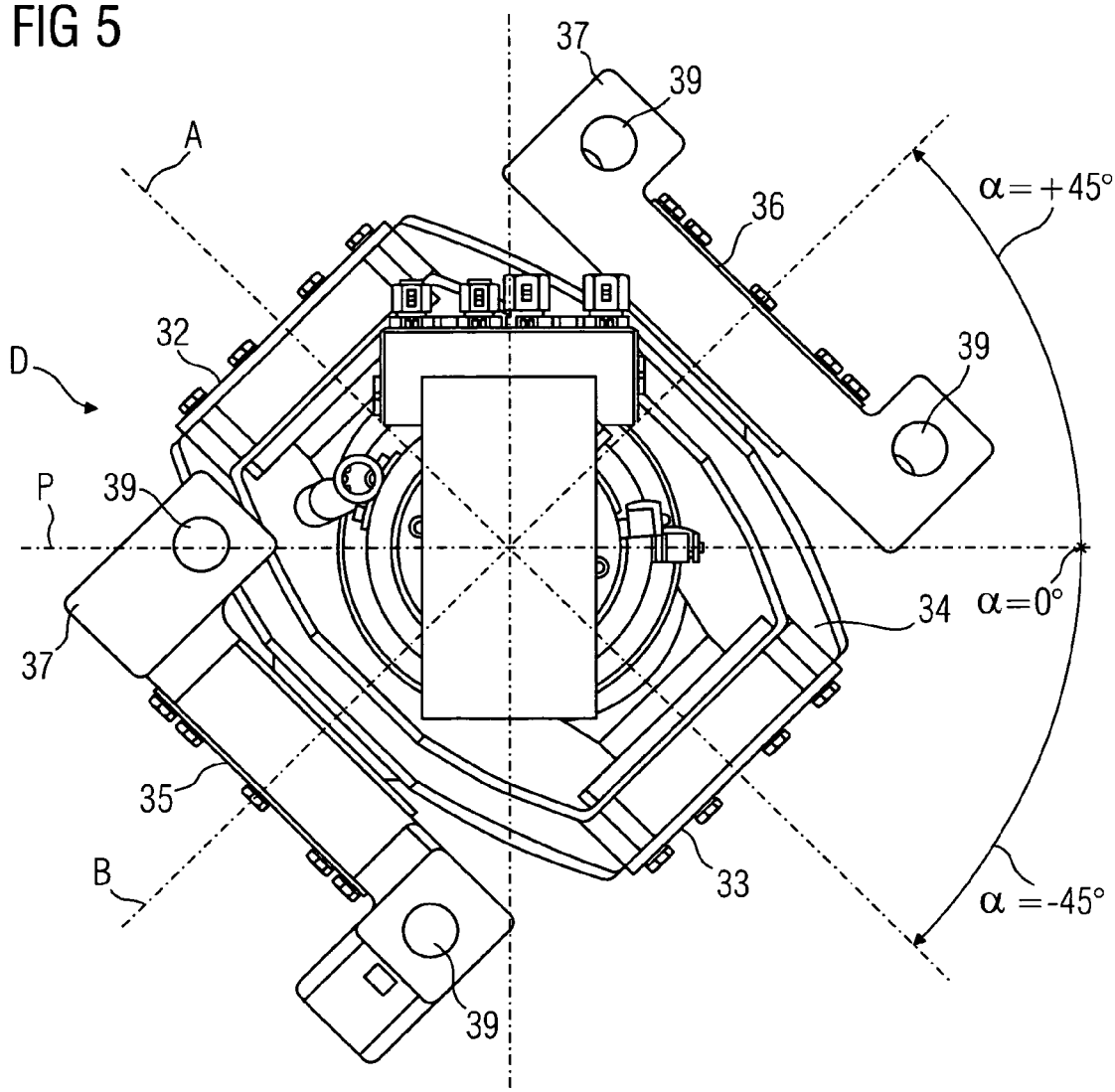
FIG. 5 shows tilt angles of bearing shafts of the device.

In case of the present embodiment of the invention the flange 5 of the piston rod 4 of the hydraulic pitch cylinder 1 is connected to a moving part 41 of the hub 40 in form of a rotatable plate 41 defining an adjusting plane P. The rotatable plate 41 is connected to a rotor blade of a wind turbine. The other end of the hydraulic pitch cylinder 1 is arranged through an opening of the hub 40 and is arranged in a housing 42. The device D is in such a way arranged or fastened at the hub 40 by means of the flanges 38 and not shown screws or bolts that the first bearing shaft A and the second bearing shaft B are arranged respectively under a certain tilt angle α relatively to the adjusting plane P and the rotatable plate 41 respectively. This situation is explicitly shown in FIG. 5. As can be seen from FIG. 5 the device D is tilted about approximately 45° relatively to the adjusting plane P and the rotatable plate 41 respectively. Thus the angular or circular rotation during the adjustment of the pitch is divided substantially equally on both bearing shafts A and B. In this manner the load can be divided on the bearings substantially equally. As can further be seen from FIG. 5 in case of the present embodiment of the invention the first and the second bearing shaft A, B are arranged substantially perpendicularly relatively to each other and are arranged substantially in a common plane.

Figure 3:
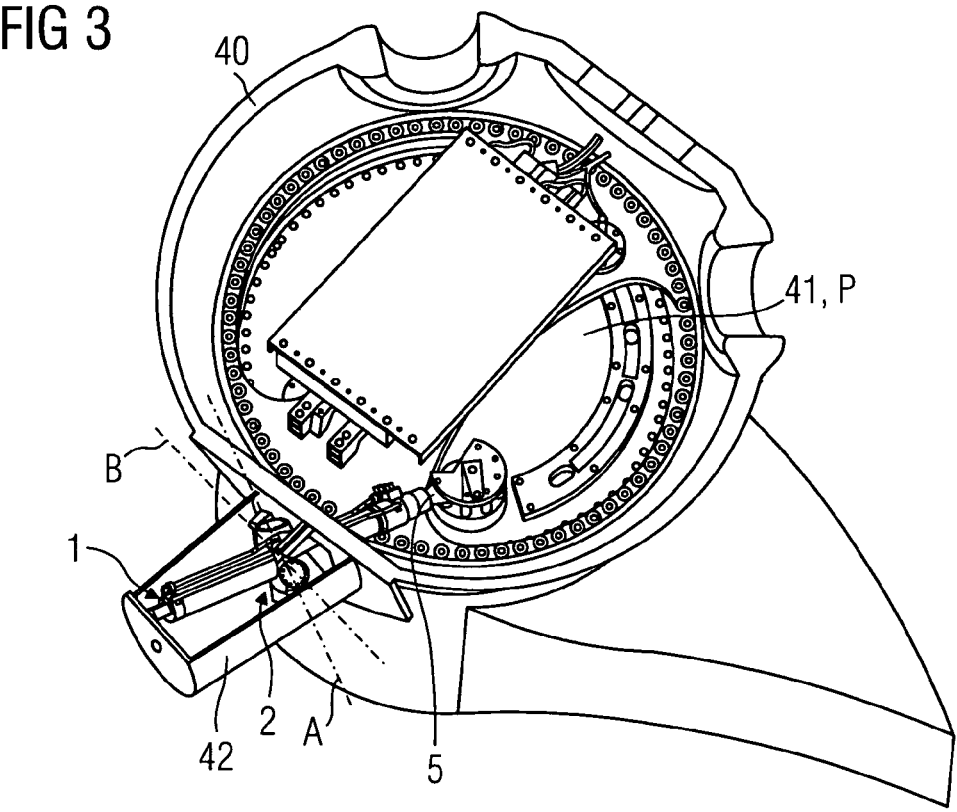
FIGS. 3, 4 shows the device of FIG. 1 attached to a hub in two different operation positions.
Figure 4:
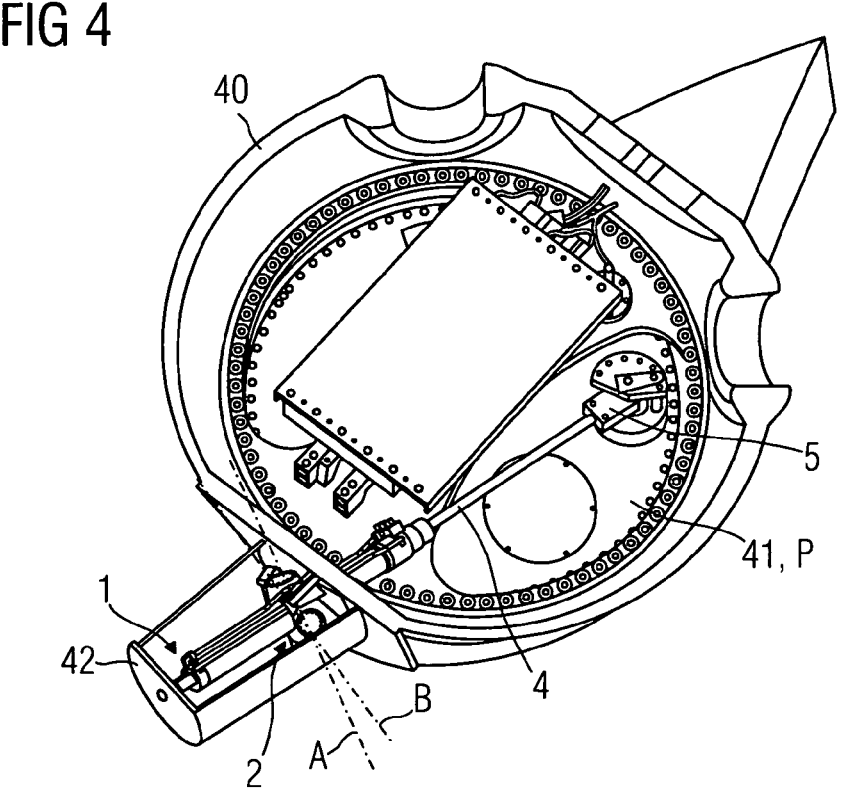

FIG. 3 shows a first operating position of the hydraulic pitch cylinder 1 in particular of the piston rod 4 in which the pitch of the rotor blade is minimal. When the piston rod 4 is adjusted relatively to the tube 3 the pitch can be adjusted respectively. Thereby the hydraulic pitch cylinder 1 pivots around the bearing shafts A and B. Thus the fixing device 2 is a kind of pendulum bearing support of the hydraulic pitch cylinder 1 attachable to a hub of a wind turbine. In FIG. 4 the maximum pitch is shown.

According to another embodiment of the device D the attachment of the device D per se at the hub 40 can be such that the device D is not tilted relatively to the adjusting plane P and the rotatable plate 41 respectively. In this case the construction of the fixing device 2 in particular the arrangement of the bearings 32, 33 and 35, 36 at the fixing device 2 must be respectively adapted to receive tilted bearing shafts A and B relatively to the adjusting plane P and the rotatable plate 41 respectively to divide the angular or circular rotation during the adjustment of the pitch substantially equally on both bearing shafts A and B.

Furthermore the tilt angel of the first bearing shaft A needs not to be −45° and the tilt angle of the second bearing shaft B needs not to be +45° relatively to the adjusting plane P and the rotatable plate 41 respectively. In fact the tilt angle of the first bearing shaft A can be chosen in the range of +10° to +80° or in the range of −10° and −80°. Also the tilt angle of the second bearing shaft B can be chosen in the range of +10° to +80° or in the range of −10° and −80°. As a rule the tilt angles of the first and the second bearing shafts A, B are chosen such that the angular or circular rotation and/or the loads of the hydraulic pitch cylinder 1 are divided preferably substantially equally onto all bearings 32, 33, 35, 36.

By the way the first and the second bearing shaft need not to be arranged substantially perpendicularly to each other or substantially in a common plane.

Figure 6:
FIG. 6 shows a cramp.

According to an alternative embodiment of the device D the first ring-like element 20 and the second ring-like element 21 can be pressed towards the respective stop ring 10, 11 by at least one cramp 50 e.g. as shown in FIG. 6. As a rule several cramps 50 are used. In this case the first ring-like element 20 and the second ring-like element 21 can have instead of the clearance holes, through borings or screw holes one or more slots around their perimeter in the sides 51, 52 which receive respectively at least one end of a cramp 50. Thus the cramps 50 e.g. made of an elastic material press the first ring-like element 20 and the second ring-like element 21 towards the respective stop ring 10, 11.

Figure 7:
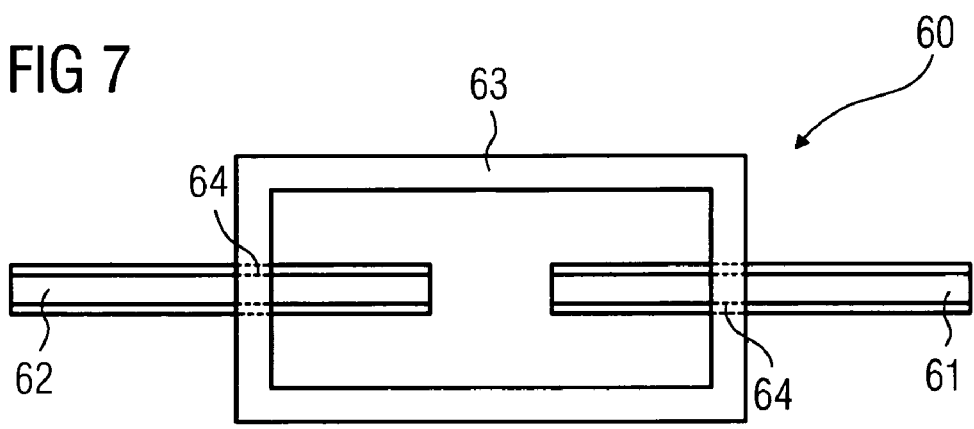
FIG. 7 shows a spreader and FIG. 8 shows schematically a tube having a projection.

According to a further embodiment of the device D the stop ring 10 can be arranged at the side 51 of the first ring-like element 20 and the stop ring 11 can be arranged at the side 52 of the second ring-like element 21 in respective not shown grooves. In this case at least one spreader 60 e.g. as shown in FIG. 7 is used between the side 22 of the first ring-like element 20 and the side 26 of the second ring-like element 21. The spreader of FIG. 7 comprises two screws 61, 62 and a retainer 63 with screw threads 64. By turning the retainer 63 in a certain direction the screws 61, 62 move out of the retainer 63. With such spreaders 60 the first ring-like element 20 can be pressed towards its stop ring and the second ring-like element 21 can be pressed towards its stop ring.

Figure 8:
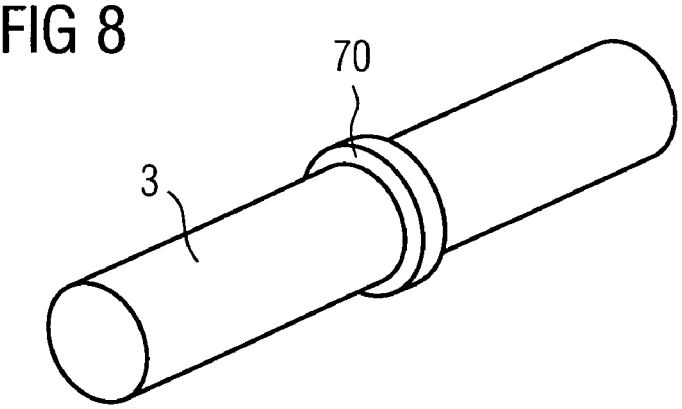

By the way a stopper needs not to be a stop ring. The stopper can also be a projection e.g. a ring-like projection 70 on the outside of the tube 3 as schematically shown in FIG. 8.

Thereby both stoppers can be a stop ring, both stoppers can be a projection or one stopper can be a stop ring and the other stopper can be a projection.

Furthermore the pitch actuator needs not to be a hydraulic pitch cylinder. The pitch actuator can also be an electric pitch actuator.

In addition in particular the contours of the outside of the tube and the inside of the first ring-like element and of the second ring-like element need not to be substantially roundly. It is also possible that the contours comprise edges or other forms as long as they fit.

Preferably a device D according to the invention is assigned to each rotor blade of a wind turbine.

The device D needs thereby not to be connected to a plate 41. The device D can also be connected to another element connected to a rotor blade of a wind turbine.

Unlike as described before the device D can also be attached or fastened at a rotor blade of a wind turbine. In this case the flange 5 is attached e.g. to a fixed plate or another fixed element of a hub defining an adjusting plane. If the device D is operated the piston rod 4 moves out of the tube 3 wherein the rotor blade is pivoted relatively to the hub.

By the way each rotor blade is pivoted in a common way relatively to the hub.

The described embodiments of the inventions are only examples. In particular hybrids of the embodiments are without any qualification within the scope of the invention.

The invention refers also to a wind turbine comprising a hub, at least one rotor blade and a described device for the adjustment of the pitch of the rotor blade.

The invention claimed is:

1. A device for the adjustment of the pitch of a rotor blade of a wind turbine, comprising:
    a pitch actuator comprising a tube; and
    a fixing device comprising:
        a first and a second ring-like element,
        each of the ring-like elements is arranged at the tube and each of the ring-like elements is supported towards a respective stopper assigned to the tube, and
        a clamping means which press the first and the second ring-like element in such a way towards the respective stopper that the fixing device and the tube are substantially non-relocatable relatively to each other,
    wherein the respective stopper comprises a stop ring and the tube comprises on the outside a groove as a receptacle for the stop ring.

2. A device according to claim 1, wherein the clamping means comprises at least a bolt, a screw, a cramp or a spreader.

3. A device according to claim 1,
    wherein both the first and the second ring-like element have a side,
    wherein the sides face each other, and
    wherein each of the sides is at least partially pressed towards the respective stopper.

4. A device according to claim 1,
    wherein both the first and the second ring-like element have a side wherein the sides are turned away from each other, and
    wherein each of these sides is at least partially pressed towards the respective stopper.

5. A device according to claim 1, wherein the tube is pressed into the first ring-like element.

6. A device according to claim 1, wherein the pitch actuator is a hydraulic pitch cylinder.

7. A device according to claim 1, wherein fixing device comprises a flange.

8. A device according to claim 1, wherein the second ring-like element is a fixing ring.

9. A device according to claim 1, wherein the fixing device comprises a bearing.

10. A device for the adjustment of the pitch of a rotor blade of a wind turbine, comprising:
   a pitch actuator comprising a tube; and
   a fixing device comprising:
      a first and a second ring-like element,
         each of the ring-like elements is arranged at the tube and each of the ring-like elements is supported towards a respective stopper assigned to the tube, and
      a clamping means which press the first and the second ring-like element in such a way towards the respective stopper that the fixing device and the tube are substantially non-relocatable relatively to each other,
   wherein the fixing device comprises a bearing.

11. A device according to claim 10, wherein the stopper is a stop ring or a ring-like projection of the tube.

12. A device according to claim 10, wherein the clamping means comprises at least a bolt, a screw, a cramp or a spreader.

13. A device according to claim 10,
   wherein both the first and the second ring-like element have a side,
   wherein the sides face each other, and
   wherein each of the sides is at least partially pressed towards the respective stopper.

14. A device according to claim 10,
   wherein both the first and the second ring-like element have a side wherein the sides are turned away from each other, and
   wherein each of these sides is at least partially pressed towards the respective stopper.

15. A device according to claim 10, wherein the tube comprises on the outside a groove as a receptacle for a stop ring.

16. A device according to claim 10, wherein the tube is pressed into the first ring-like element.

17. A device according to claim 10, wherein the pitch actuator is a hydraulic pitch cylinder.

18. A device according to claim 10, wherein fixing device comprises a flange.

* * * * *